(12) United States Patent
Tuz et al.

(10) Patent No.: US 11,534,706 B2
(45) Date of Patent: Dec. 27, 2022

(54) ELECTRIC FILTER

(71) Applicant: SCIENCE & PRACTICE LIMITED LIABILITY COMPANY, Moscow (RU)

(72) Inventors: Nikolay Anatolevich Tuz, Moscow (RU); Denis Valerevich Kurganov, Moscow (RU)

(73) Assignee: SCIENCE & PRACTICE LIMITED LIABILITY COMPANY, Moscow (RU)

( * ) Notice: Subject to any disclaimer, the term of this patent is extended or adjusted under 35 U.S.C. 154(b) by 91 days.

(21) Appl. No.: 17/282,205

(22) PCT Filed: Oct. 4, 2018

(86) PCT No.: PCT/RU2018/000656
§ 371 (c)(1),
(2) Date: Apr. 1, 2021

(87) PCT Pub. No.: WO2020/071941
PCT Pub. Date: Apr. 9, 2020

(65) Prior Publication Data
US 2021/0339174 A1    Nov. 4, 2021

(30) Foreign Application Priority Data
Oct. 2, 2018    (RU) .......................... RU2018134612

(51) Int. Cl.
*B01D 35/06*  (2006.01)
*B01D 17/06*  (2006.01)
(52) U.S. Cl.
CPC ............. *B01D 35/06* (2013.01); *B01D 17/06* (2013.01)
(58) Field of Classification Search
CPC ................................. B01D 17/06; B01D 35/06
See application file for complete search history.

(56) References Cited

U.S. PATENT DOCUMENTS 3,980,541 A    9/1976  Aine
4,961,845 A   10/1990  Dawson et al.
(Continued)

FOREIGN PATENT DOCUMENTS

RU    2 058 828      4/1996
RU      158 784      1/2016
SU      691199      10/1979

OTHER PUBLICATIONS

International Search Report for PCT/RU2018/000656 dated Jun. 13, 2019, 3 pages.
(Continued)

*Primary Examiner* — Brian W Cohen
(74) *Attorney, Agent, or Firm* — Nixon & Vanderhye PC

(57) ABSTRACT

The invention relates to devices for purifying hydraulic and dielectric fluids (oils and fuels) of mechanical impurities. Electric filter for purifying hydraulic and dielectric fluids comprises a housing with an inlet pipe and outlet pipe, high-voltage power supply, composite unit disposed inside the housing and consisting of current-carrying plates and dielectric spacers with apertures for current-carrying and heavy-duty fastening elements, a front plug and rear plug, and current-carrying and heavy-duty fastening elements, wherein the surface of the current-carrying plates is provided with a porous ceramic dielectric coating. The technical result consists in: increasing the efficiency of purifying dielectric fluids; stabilizing the electromagnetic field of the electric filter; increasing the surface area of the electric filter by creating a developed surface of current-carrying filter elements without changing the filter size and mass; improving reliability and ease of use; and reducing the materials consumption.

5 Claims, 4 Drawing Sheets

(56) References Cited

U.S. PATENT DOCUMENTS

| | | | | |
|---|---|---|---|---|
| 5,556,522 | A | * 9/1996 | Ingalls | B01D 35/06 |
| | | | | 204/276 |
| 2001/0037941 | A1 | 11/2001 | Thompson | |
| 2008/0302663 | A1* | 12/2008 | Jarvis | B01D 17/06 |
| | | | | 204/554 |
| 2020/0094167 | A1* | 3/2020 | Chase | C10G 33/02 |

OTHER PUBLICATIONS

Written Opinion of the ISA for PCT/RU2018/000656 dated Jun. 13, 2019, 4 pages.

* cited by examiner

ELECTRIC FILTER

This application is the U.S. national phase of International Application No. PCT/RU2018/000656 filed Oct. 4, 2018 which designated the U.S. and claims priority to RU Patent Application No. 2018134612 filed Oct. 2, 2018, the entire contents of each of which are hereby incorporated by reference.

FIELD OF THE INVENTION

The invention relates to devices for purifying hydraulic and dielectric fluids (oils and fuels) of mechanical impurities.

BACKGROUND

The prior art discloses an electric purifier of dielectric fluids consisting of a housing, restraining plates, set of connecting electrodes, float cutoff valve, longitudinal electrical baffles, purified fluid inlet and outlet pipes, insulating pads, covers, mounting studs, power wiring and fastening elements (SU691199, publ. 15.10.1979).

The disadvantage of this device is unstable electromagnetic field due to non-controllable high-voltage power supply of electric filter, variation of electromagnetic field as contaminations are accumulated.

The closest prior art discloses a filter for purifying dielectric fluids characterized in that it comprises a housing consisting of two parts interconnected by flange connections, and housing is fixed at 20°±5°, with the upper part comprising collecting electrode power supply, and the lower one includes a pack of collecting electrode plates with apertures 1 mm wide covering all electrode area, and dielectric plates have apertures 5 mm wide (RU158784, publ. 20.01.2016).

The disadvantages of this device are as follows: low efficiency of dielectric fluid purifying, unstable electromagnetic field due to non-controllable high-voltage power supply of electric filter, variation of electromagnetic field as contaminations are accumulated, poor reliability, unhandiness, high materials consumption.

DISCLOSURE OF THE INVENTION

The technical problem is creation of a device able to purify and reclaim hydraulic and dielectric fluids effectively.

The technical result consists in: increasing the efficiency of purifying dielectric fluids; stabilizing the electromagnetic field of the electric filter; increasing the surface area of the electric filter by creating a developed surface of current-carrying filter elements without changing the filter size and mass; improving reliability and ease of use; and reducing the materials consumption.

The technical result is achieved due to the fact that the electric filter for purifying hydraulic and dielectric fluids comprises a housing with an inlet pipe and outlet pipe, high-voltage power supply, composite unit disposed inside the housing and consisting of current-carrying plates and dielectric spacers with apertures for current-carrying and heavy-duty fastening elements, a front plug and rear plug, and current-carrying and heavy-duty fastening elements, wherein the surface of the current-carrying plates is provided with a porous ceramic dielectric coating.

Current-carrying plate aperture for current-carrying stud has inner teeth.

High-voltage power supply is current and voltage controlled and is configured on the outer part of the electric filter housing for short-circuit operation.

High-voltage power supply is configured to operate at 1250 V-4750 V.

Through holes with a diameter sufficient for user's fingers penetration are arranged on plugs' face.

There is a seal on each plug circumference.

EMBODIMENT OF THE INVENTION

Figure 1:
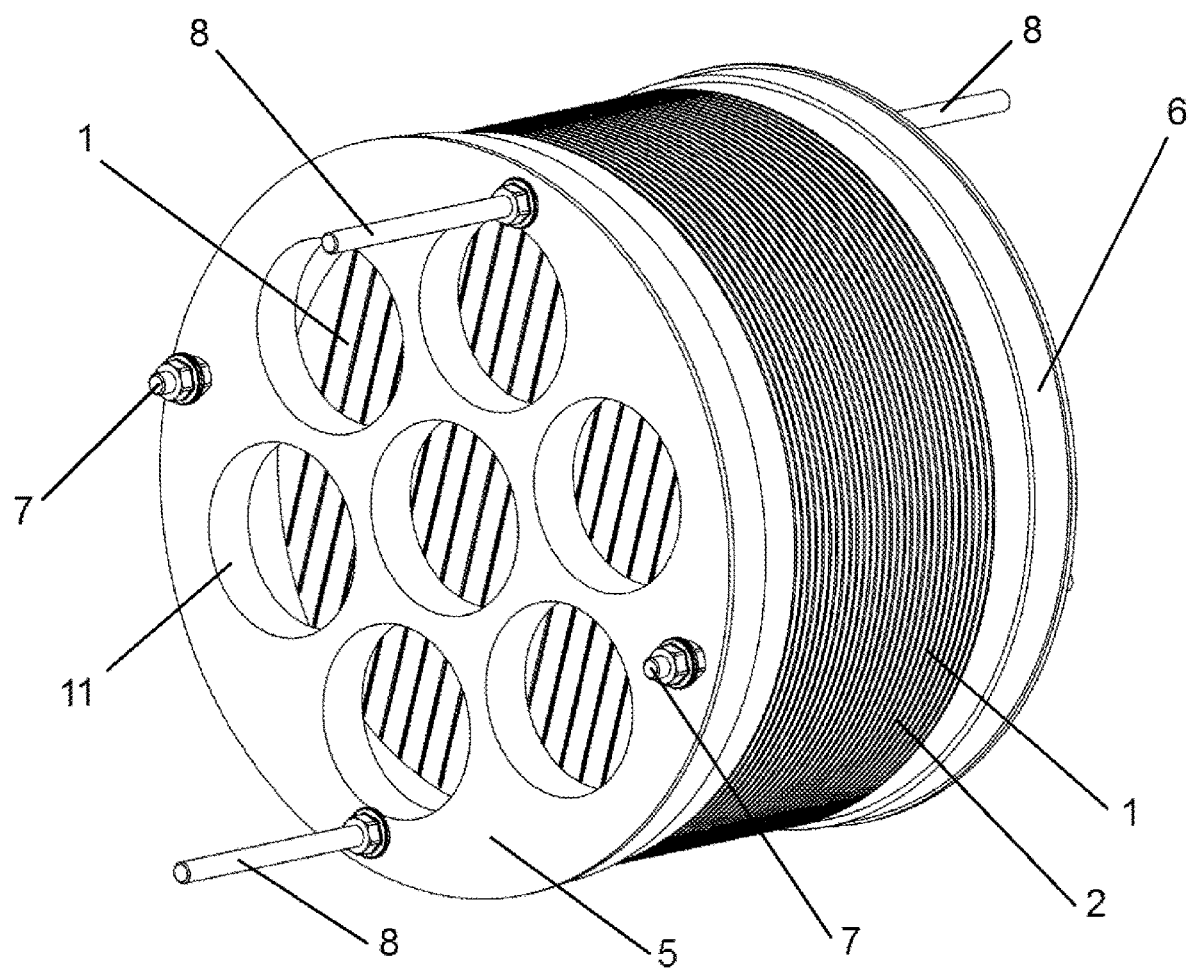
FIG. 1—Electric filter assembly, without housing.
Figure 2:
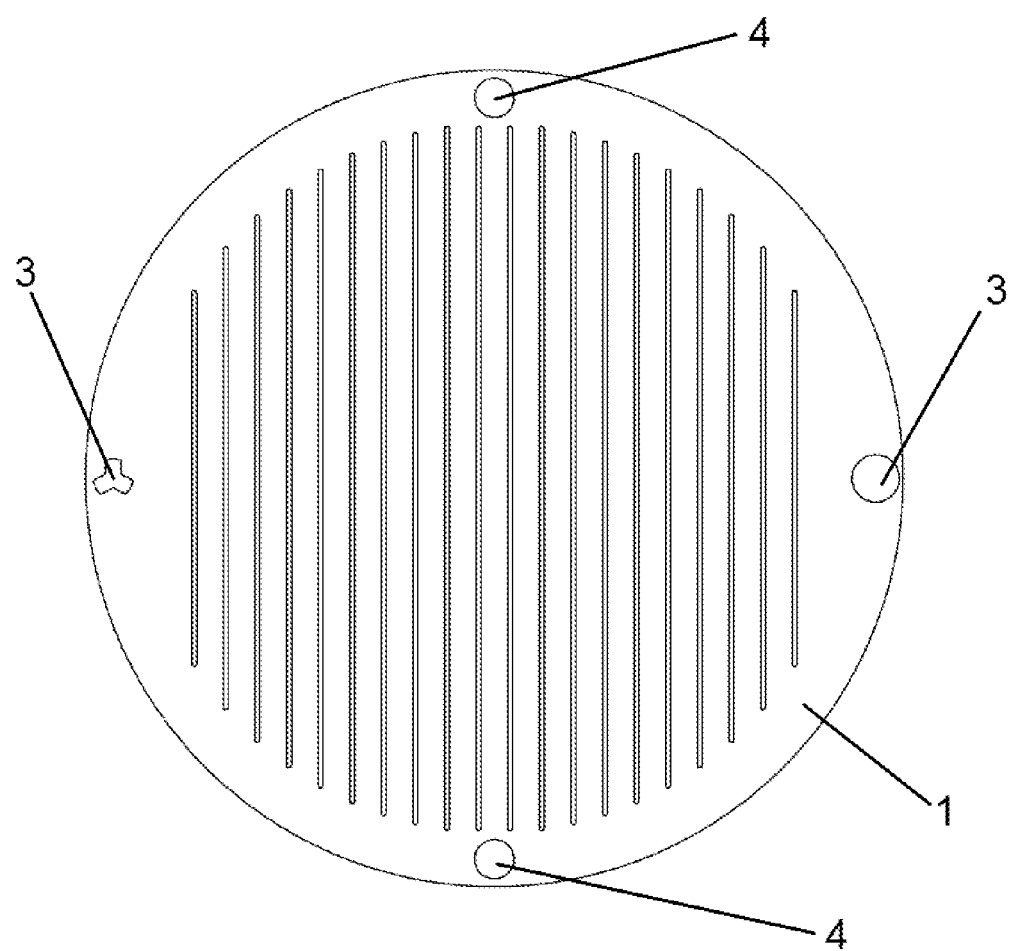
FIG. 2—Current-carrying plate.
Figure 3:
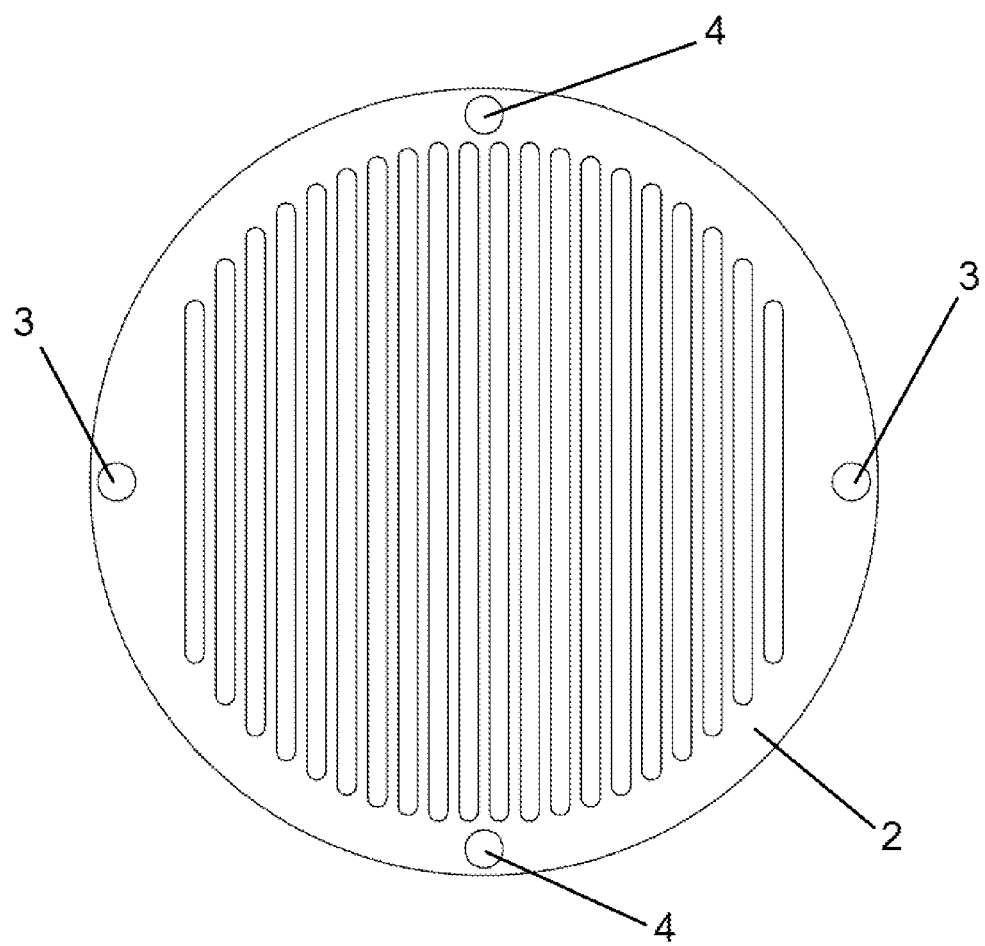
FIG. 3—Dielectric spacer.
Figure 4:
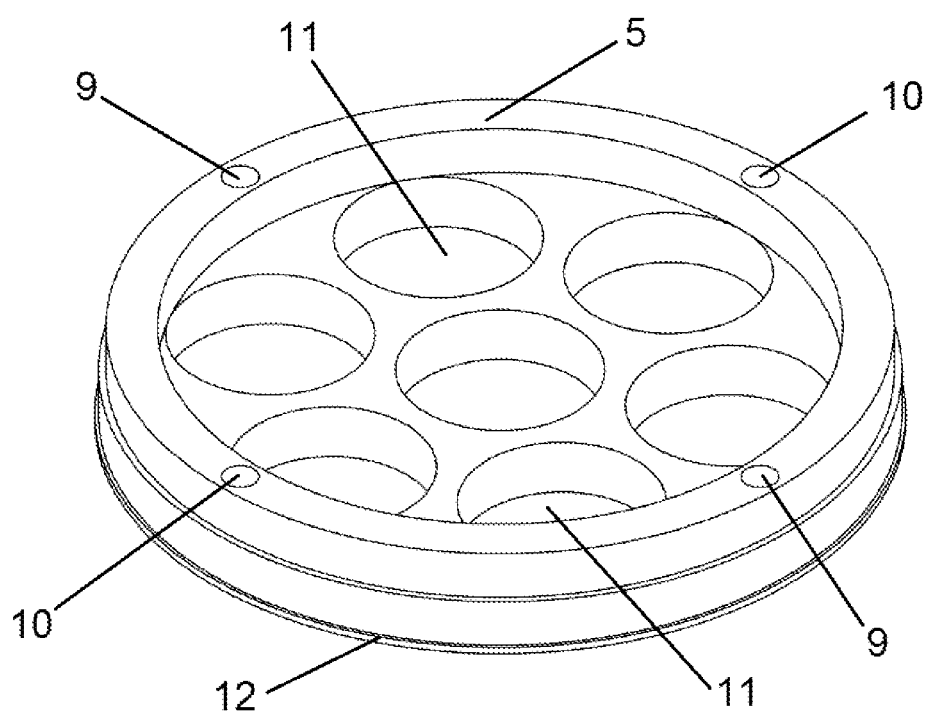
FIG. 4—Plug.

Electric filter is designed for purifying hydraulic and dielectric fluids (oils and fuels) and consists of a mechanical part, namely, cylindrical housing with inlet and outlet pipes, composite unit disposed inside the housing and consisting of even number of current-carrying plates 1 and odd number of dielectric spacers 2 with apertures for current-carrying 3 and heavy-duty 4 fastening elements, front plug 5 and rear plug 6, and current-carrying 7 and heavy-duty 8 fastening elements (studs), and of an electrical part, namely, high-voltage current and voltage controlled power supply (not shown), fixed on the outer part of the electric filter housing and configured for short-circuit operation, electrical harness and grounding circuit.

Current-carrying plates 1 and dielectric spacers 2 have apertures. Width of current-carrying plate apertures is less than width of dielectric spacer apertures. Apertures of current-carrying plates cover all area and together with apertures of dielectric spacers form contamination collecting cells.

Surface of current-carrying plates 1 is provided with a porous ceramic dielectric coating, e.g. oxidation. Besides, aperture 3 in current-carrying plates 1 for current-carrying stud 7 has inner teeth.

Front plug 5 and rear plug 6 are disposed in front and rear parts of electric filter housing, respectively, they are round, to size of internal diameter of a cylindrical housing, with through apertures 9, 10 along the edges for current-carrying and heavy-duty fastening elements, and designed to keep a set of plates and spacers assembled and to fix them in the required position in the housing. Besides, on the plugs' face there are additional through holes 11 stiffening plugs, reducing their materials consumption, and also improving installation and deinstallation of plugs, since these holes 11 have a diameter sufficient for user's fingers penetration, grasping plug with fingers for its deinstallation/installation, Besides, there is a seal 12 on each plug circumference for better hermetization and fixation of plugs with a set of plates and spacers in the cylindrical housing.

In contrast to closest prior art the high-voltage power supply od the claimed solution is fixed on the outer part of the electric filter housing. Such position of the high-voltage power supply enables maximum efficient operation of the electric filter avoiding interference in operation of elements disposed inside the housing, ensuring safety in case of the power supply failure, improving its serviceability, installation/deinstallation, reducing materials consumption of the device as a whole.

High-voltage current and voltage continuously controlled power supply stabilizes electric field, expanding its operation modes to short-circuit operation as a normal state, Electromagnetic (electrostatic) field control enables to adjust electric filter operation to different types of contaminations or their combinations. The best results of dielectric fluids purifying are achieved at 1250 V 4750 V.

Porous ceramic dielectric coating on current-carrying plates enables to expand the area of focusing elements. The said coating in combination with the high-voltage controlled power supply enables to remove mechanical impurities from dielectric fluids (oils, fuels) most effectively.

Furthermore, when using the said coating, the secondary static field occurs during passing of contaminated dielectric fluids. The secondary static field occurs due to passing of differently charged particles of contaminations through a gauze of the filter electromechanical part.

The device operates as follows.

Contaminated dielectric fluid (oil, fuel) enters the housing through inlet pipe, Contaminated dielectric fluid passes through apertures of current-carrying plates 1, is exposed to electrostatic fields occurring at power supply to studs 7 by high-voltage power supply. Current-carrying plates 1 are alternating with each other in one plate, and multidirectional voltage is supplied to even and odd current-carrying plates 1. There are dielectric spacers 2 between all current-carrying plates. One of the studs is connected to a positive potential, the other one is connected to a negative potential, Difference of potential is produced between the plates. When voltage of 1250 V 4750 V (depending on types of contaminations or their combination) is supplied, neutral particles of contaminations acquire positive and negative charges, attract each other, are enlarged and removed from liquid dielectric flow, precipitate and are retained in contamination collecting cells formed by current-carrying plates and dielectric spacers. Purified dielectric fluid is removed from the housing through the corresponding outlet pipe.

An aperture of current-carrying plates for current-carrying stud has inner teeth for better contact of current-carrying stud with current-carrying plates and for better stabilization of electromagnetic field. Surface of current-carrying plates is provided with a porous ceramic dielectric coating to expand their effective area.

High-voltage power supply generates magnetic field and holds it constant by variation of current and voltage. The best results of dielectric fluids purifying have been achieved at 1250 V-4750 V. When voltage below 1250 V is selected, no required electric field occurs magnetizing of impurities is weak, and when voltage above 4750 V is selected, there is additional magnetizing of impurities and separation of impurities from the electric filter.

The invention claimed is:

1. An electric filter for purifying hydraulic and dielectric fluids comprising:
    a housing with an inlet pipe and an outlet pipe,
    a power supply,
    a composite unit disposed inside the housing and consisting of
        current-carrying plates and dielectric spacers with apertures for current-carrying and fastening elements,
    a front plug,
    a rear plug, and
    current-carrying and fastening elements,
        wherein the surface of the current-carrying plates is provided with a porous ceramic dielectric coating, and
        the apertures of the current-carrying plates comprise inner teeth for improved contact with the current-carrying elements.

2. The electric filter of claim 1 wherein the power supply is current and voltage controlled and is configured on the outer part of the electric filter housing for short-circuit operation.

3. The electric filter of claim 1 wherein the power supply is configured to operate at high voltage between 1250 V-4750 V.

4. The electric filter of claim 1 wherein the front plug and rear plug further comprise through holes.

5. The electric filter of claim 1 wherein there is a seal on each plug circumference.

* * * * *